Patented Oct. 10, 1933

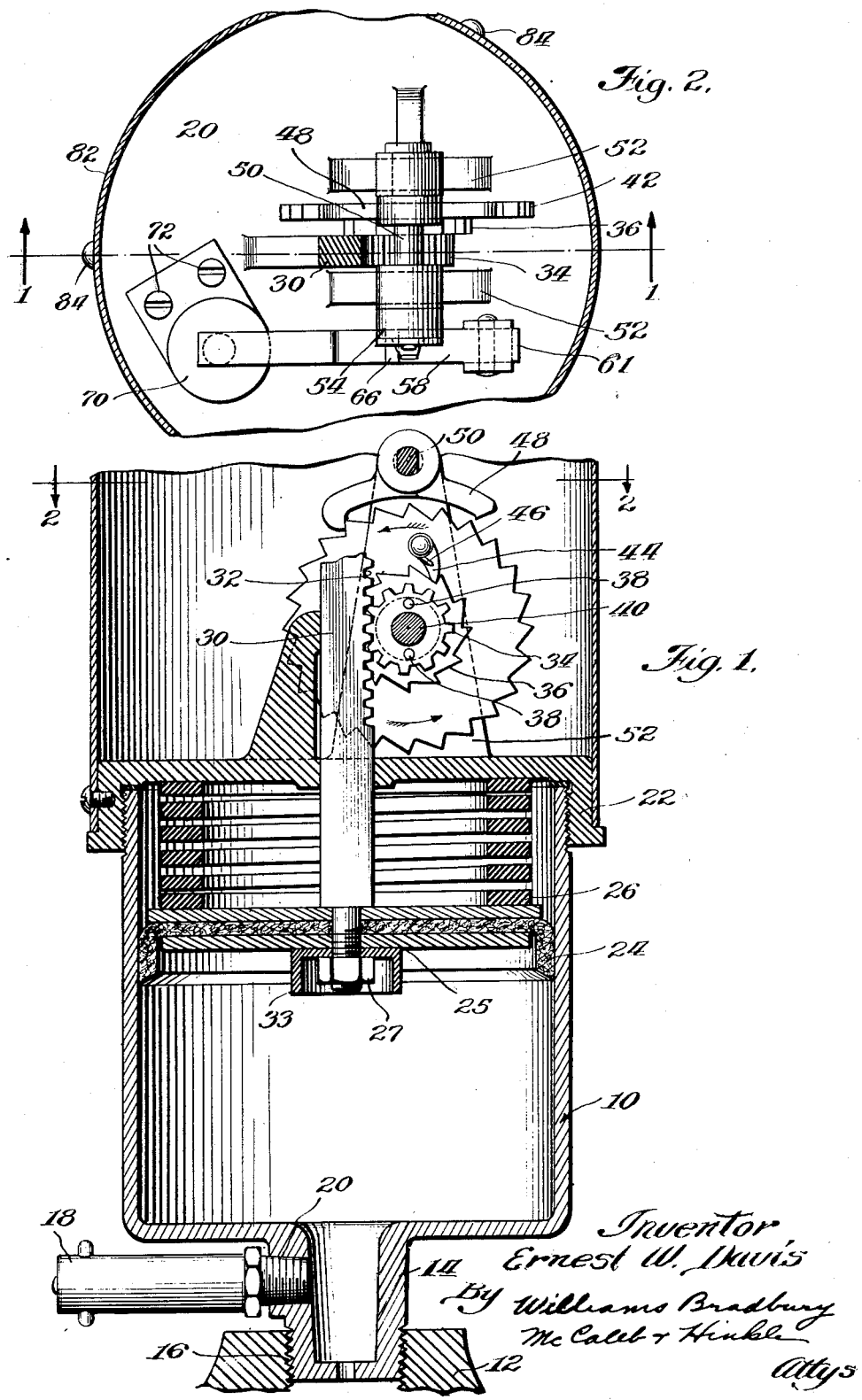

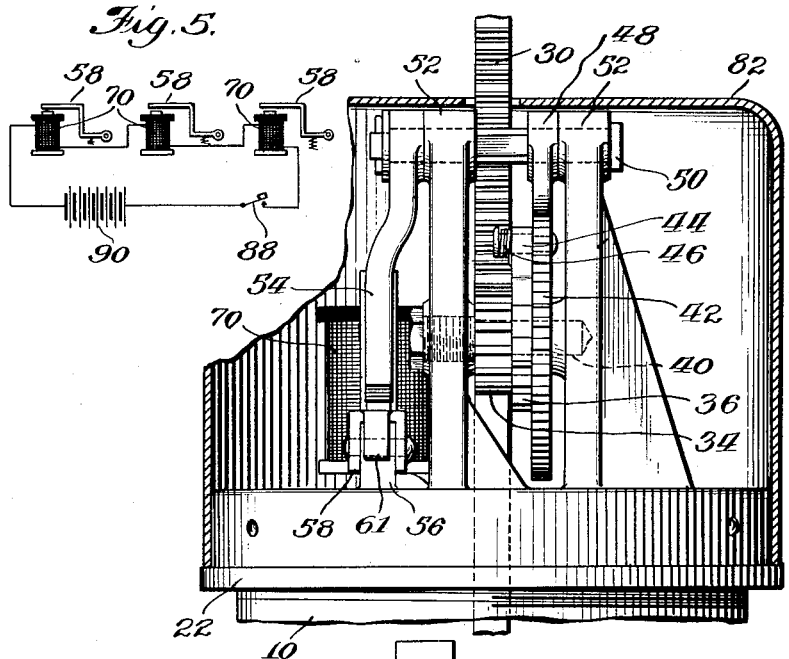
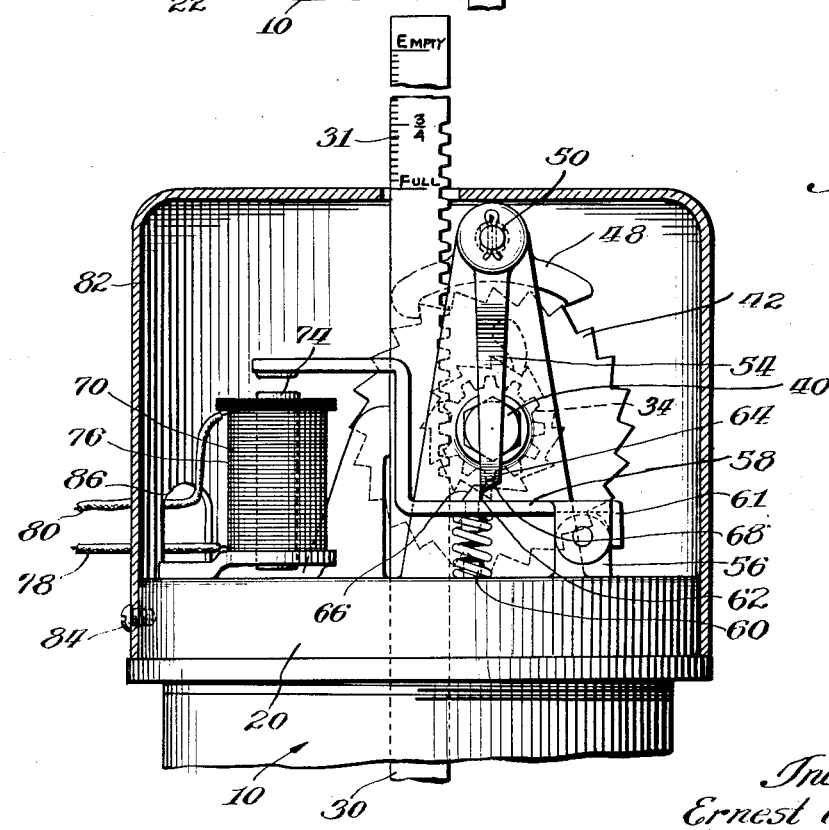

1,929,774

UNITED STATES PATENT OFFICE 1,929,774

LUBRICATING APPARATUS

Ernest W. Davis, Oak Park, Ill., assignor to Alemite Corporation, Chicago, Ill., a corporation of Delaware Application January 10, 1929. Serial No. 331,405

8 Claims. (Cl. 184—45)

My invention relates to lubricating apparatus and more particularly to a system of lubrication wherein the principal elements are electrically controlled grease cups and a remote control station for the same.

In the lubrication of machines in factories and industrial plants and also in the lubrication of automobiles, the bearings frequently are located in relatively inaccessible places, making it difficult, when using the ordinary compression grease cup, for the operator of the machine to turn down the grease cups. The task of taking care of the lubrication is thus frequently neglected. In some machines the bearings are moving or have moving parts in the way so that the operation of turning down the grease cups is either very dangerous or impossible unless the machine is stopped.

To overcome this and the many other difficulties encountered in lubricating inaccessible and inconveniently placed bearings, one of the objects of my invention is to provide an improved compression grease cup which may be operated to lubricate the bearings by the simple expedient of closing an electric switch placed in any convenient place, or may be automatically controlled by an electric time switch.

A further object is to provide an improved lubricant feeding device in which the rate of feed may be electrically controlled.

A further object is to provide an improved electrically controlled lubricant feeding device which may be readily refilled without disengaging the feeding mechanism.

A further object is to provide an improved electromagnetically operated escapement mechanism for controlling the rate of discharge of a lubricant feeding device.

A further object of my invention is to provide an improved grease cup adapted to hold a quantity of lubricant under pressure, a portion of which may be forced into the bearing to be lubricated at optional intervals by remote control means.

A further object is to provide an improved reservoir type grease cup having indicating means to disclose the amount of lubricant in the cup.

A further object is to provide an improved electrically controlled reservoir grease cup having its entire operating mechanism mounted thereon and forming a self-contained and complete unit.

A further object is to provide an improved grease cup having a simple, reliable and durable actuating means that may be economically manufactured.

Other objects and advantages of my invention will appear more fully from the following description and from the accompanying drawings, in which Fig. 1 is a central vertical cross sectional view of the reservoir grease cup shown mounted on a bearing;

Fig. 2 is a horizontal sectional view taken on the line 2—2 of Fig. 1;

Fig. 3 is an elevation of the upper portion of the grease cup, the cover being shown in section;

Fig. 4 is a side elevation of the parts shown in Fig. 3; and

Fig. 5 is a wiring diagram of an electrical circuit used to control the operation of several grease cups in series.

The reservoir grease cup 10 is mounted on a bearing 12 by means of a reduced end portion 14 which is screwed into a suitably tapped hole 16. A lubricant receiving fitting 18 of any well-known type is screwed into a tapped hole 20 in the reduced end of the grease cup. The upper end of the grease cup is closed by a cap 22 and inside the grease cup is a piston 24 normally pressed downwardly by a compression spring 26. The piston is provided with a guide 30 which has rack teeth 32 formed at one edge. The upper end of this guide has an indicating scale 31 on its side to show the position of the piston.

The cup leather piston 24, together with its packing and face plates, is secured over a portion 25 of reduced diameter at the lower end of the guide 30. An inverted cup-shaped limit stop 33 is also secured upon the reduced end portion 25, the piston face plates and stop being secured to the portion 25 by a nut 27. The stop 33 limits downward movement of the piston 24 so as to prevent deformation of the ends of the cup leather thereof against the bottom of the grease cup.

Rotatably mounted on stud 40 and in mesh with the rack is a pinion 34. The pinion 34 is connected to a ratchet-wheel 36 by pins 38. Rotatably mounted on the same stud is an escapement wheel 42 which carries a pawl 44 normally held in engagement with the ratchet-wheel 36 by a spring 46. An escapement wheel anchor 48 is non-rotatably mounted on a shaft 50 which is journaled in standards 52.

An actuating arm 54 is non-rotatably mounted at the end of shaft 50 (Figs. 3 and 4). Positioned on the top 22 is an upright lug 56, on which a vibrating lever 58 having a depending ear 61 which engages the lug 56, is pivotally mounted.

This lever is normally held in the position shown by compression spring 60. Rigidly secured to the vibrating lever is a stop 62 having a vertical face 64 and an inclined face 66, for engagement with a cam face 68 at the end of actuating arm 54.

An electromagnet 70 is secured on the top 22 by means of screws 72. The electromagnet has a core 74, a winding 76, and two lead-in wires 78 and 80. A protective cover 82 is provided for the entire top of the reservoir grease cup, being attached to the top 22 by screws 84. The cover has an open end slot 86 for the electromagnet lead-in wires 78 and 80.

Figure 5 shows an optional method of connecting a plurality of the electromagnetically controlled grease cups previously described. In this diagram a source of electric current, represented by a battery 90, is connected in series with a plurality of the electromagnets 70 of the various grease cups. A switch 88, which may be manually operated or may be controlled by a suitable clock mechanism or by a moving part of the machine upon which the grease cups are attached, is adapted to complete the electric circuit through the electromagnets 70 at any desired frequency.

While three grease cups are shown in this diagram, it will be understood that practically any number may thus be connected in series. In the event that a large number are to be controlled by a single switch, the electromagnets are preferably connected in parallel.

The operation of the above-described grease cup is as follows:

The grease cup reservoir 10 is filled with lubricant by the usual lubricant compressor which is coupled to the fitting 18. While a small amount of lubricant may be forced directly to the bearing, the size of the discharge opening, the resistance of the bearing, and the usual high rate at which lubricant is fed into the cup, prevent an excessive amount of grease from thus being fed directly to the bearing. The entering grease raises the piston 24 and compresses the spring 26. The rack 30 rotates the pinion 34 and ratchet-wheel 36 clockwise until the reservoir is filled, the pawl 44 permitting clockwise rotation of the ratchet-wheel without actuating the escapement-wheel 42. The escapement-wheel is of course held against movement by the anchor 48. The operator may ascertain that the grease cup is full by observing the indication on the scale 31. Upon completion of the filling operation the piston 24 is held against downward movement by the escapement-wheel anchor 48 which is coupled to the pinion 34 and ratchet-wheel 36 by the pawl 44.

Upon closing the switch 88 an electrical circuit will be completed through the electromagnets 70 of each of the grease cups. The energized electromagnet will draw downwardly the end of the vibrating lever 58 and the actuating arm 54 will thus be released from the stop 62 and swing to the left and then to the right as the escapement-wheel anchor is rocked by the escapement-wheel 42 which is rotated by the force of the spring 26 transmitted through the rack 30, pinion 34, ratchet-wheel 36 and pawl 44.

The switch 88 is ordinarily closed only momentarily so that prior to the time that the actuating arm 54 has completed a full oscillation the switch will have been opened and the vibrating lever 58 swung away from the electromagnet by the spring 60 and the stop will then be in position to arrest further oscillation of the actuating arm 54.

Should the switch 88 be opened prior to the time that the actuating arm has passed the stop 62 on its rightward stroke, the beveled end of the actuating arm will cammingly engage the face 66 of the stop 62 and force the vibrating lever downwardly to permit completion of the full oscillation of the actuating arm. Of course by having both faces of the stop vertical and having the end of the actuating arm 54 square, the actuating arm 54 may be arrested at the center of both its rightward and leftward oscillatory strokes and the grease cup thus made to feed lubricant to the bearing at only half the usual speed.

It will of course be understood that the grease cup will continue to feed the lubricant to the bearing as long as the switch 88 remains closed. The operator may readily ascertain when the grease cups need to be filled by observing the extent of protrusion of the guides 30 above the tops of the covers 82.

It will thus be seen that I have provided a compression grease cup which may be easily filled without disconnecting any of the discharge controlling means and a plurality of which may be controlled by a single remotely located electric switch to feed lubricant to their respective bearings at any desired rate.

The invention is capable of wide variation within equivalent limits and I contemplate such variation as may be desirable or useful in the particular adaptation of the invention shown, or in its adaptation to other devices. I do not restrict myself in any unessential particulars; but what I claim and desire to secure by Letters Patent is:

1. In a reservoir grease cup, a grease reservoir, a piston, a spring acting directly upon said piston for expelling grease under pressure, and remotely controlled escapement means for controlling the movement of the piston step by step.

2. In a reservoir grease cup, a chamber, a piston therein for expelling grease therefrom, a spring acting directly upon said piston, escapement means to control the operation of said piston.

3. In a reservoir grease cup, a grease reservoir, a spring pressed plunger therein for expelling grease under pressure therefrom, and means for releasing the compression of said spring by remotely controlled electromagnetically operated means, said releasing means comprising an escapement mechanism and a one-way gearing connection between said mechanism and said plunger.

4. In a grease cup, the combination of a grease chamber, means for filling said chamber, a spring pressed plunger, said spring pressed plunger being adapted to be compressed by the filling of said chamber, means to hold said spring compressed, and optionally operable escapement means to release said spring to expel a predetermined amount of lubricant.

5. In a device of the class described, the combination of a lubricant reservoir, means to attach said reservoir to a bearing to be lubricated, a piston in said reservoir, a spring for moving said piston to discharge lubricant from said reservoir, means for filling said reservoir whereby upon supplying lubricant to said reservoir said piston will be moved against the force of said spring, an escapement mechanism for controlling the discharging movement of said piston, and electromagnetically operated means for controlling said escapement mechanism.

6. A lubricant feeding device comprising a reservoir having a resilient wall, means for supplying lubricant to said reservoir, said resilient wall being moved outwardly to increase the capacity of said reservoir upon supplying lubricant under pressure thereto, an escapement mechanism for controlling inward movement of said resilient wall, and means for controlling the operation of said escapement mechanism.

7. In a device of the class described, the combination of a cylindrical reservoir, a piston therein, a spring for forcing said piston downwardly to discharge lubricant from said reservoir, a rack carried by said piston, an escapement mechanism, a one-way driving connection between said rack and escapement mechanism, and electromagnetically operated means for controlling the operation of said escapement mechanism.

8. A lubricant feeding device comprising a reservoir having a resilient wall, means for supplying lubricant to said reservoir, said resilient wall being moved outwardly to increase the capacity of said reservoir upon supplying lubricant thereto under pressure, an escapement mechanism for controlling inward movement of said resilient wall, means for controlling the operation of said escapement mechanism, and visual means for indicating the quantity of lubricant in said reservoir.

ERNEST W. DAVIS.